July 14, 1936.  W. P. LLOYD ET AL  2,047,478

PAPER FEEDING AND CUTTING MECHANISM

Filed Oct. 28, 1935   7 Sheets-Sheet 1

INVENTORS
Whitten P. Lloyd and
Maxwell H. Hill

Harold E. Stonebraker
ATTORNEY

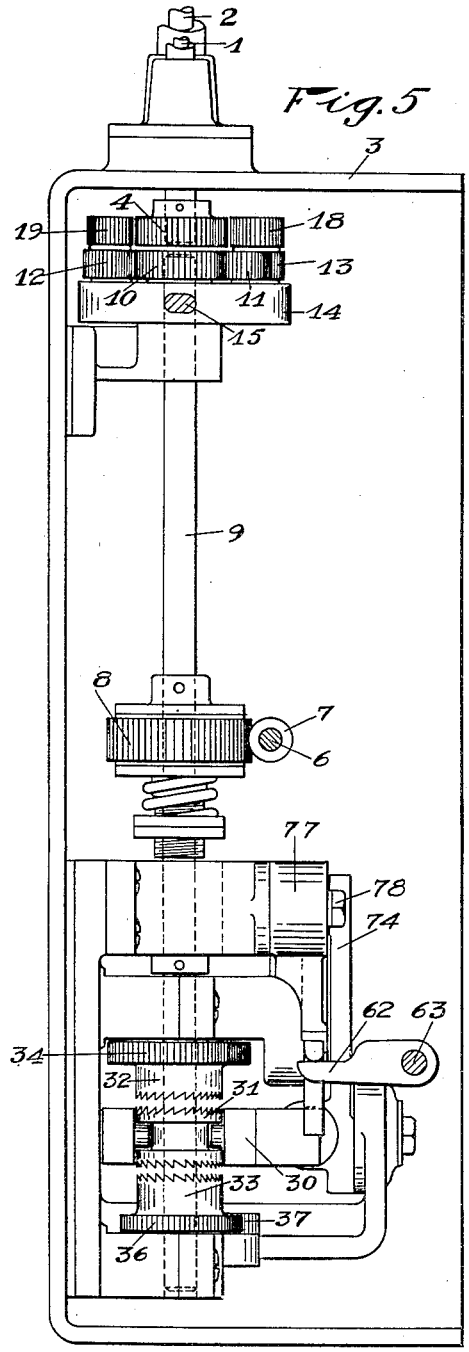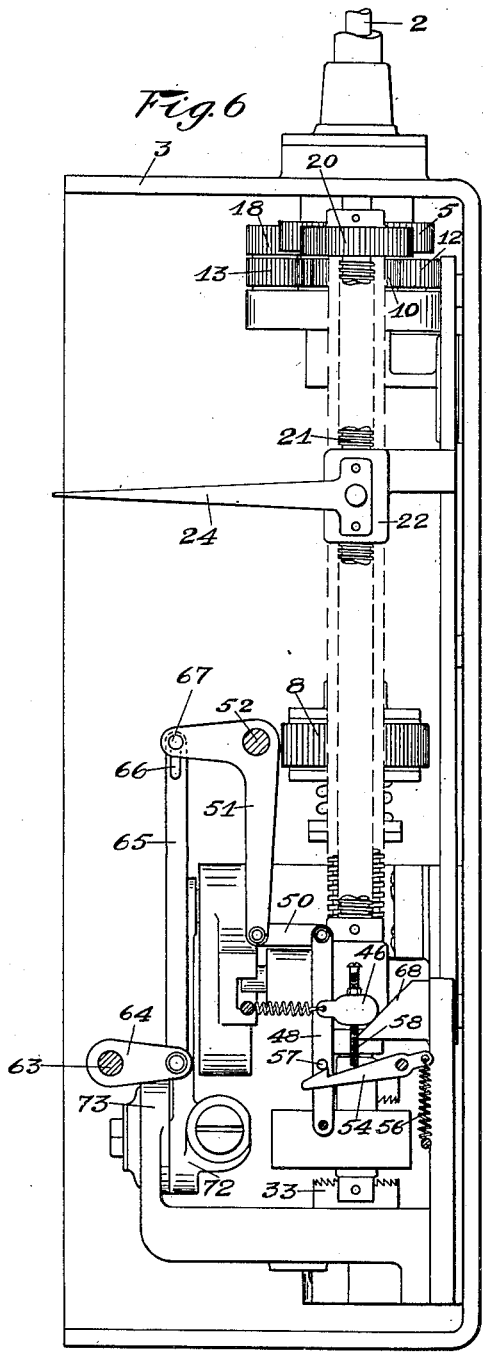

July 14, 1936.  W. P. LLOYD ET AL  2,047,478
PAPER FEEDING AND CUTTING MECHANISM
Filed Oct. 28, 1935   7 Sheets-Sheet 6
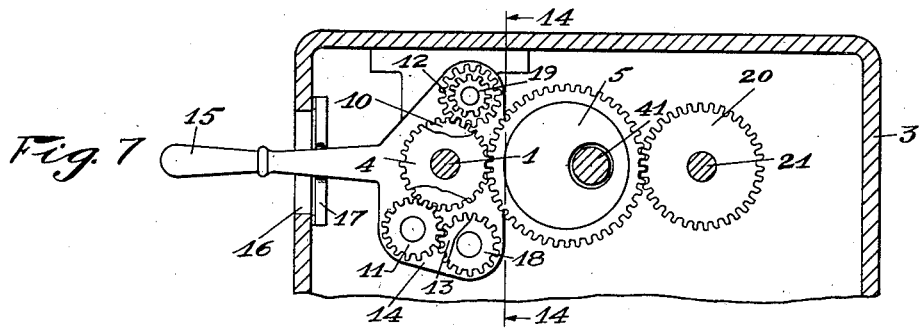
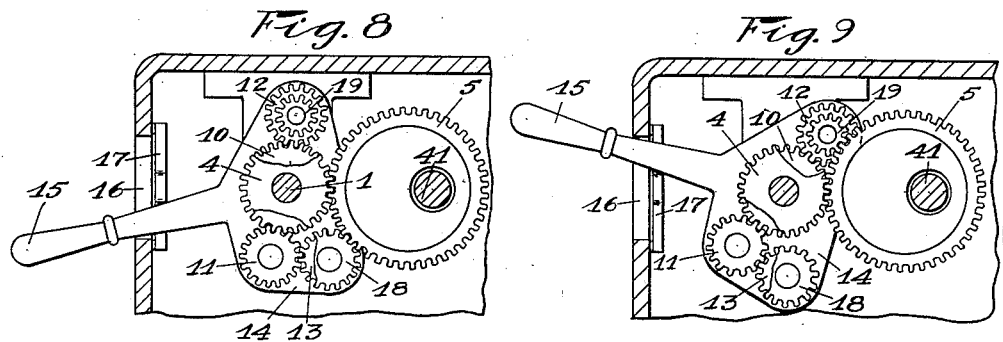
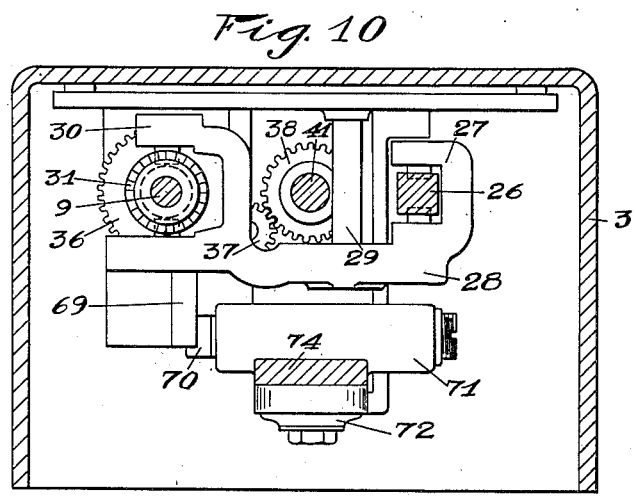
INVENTORS
Whitten P. Lloyd and
Maxwell H. Hill
BY Harold E. Stonebraker
ATTORNEY INVENTORS
Whitten P. Lloyd
Maxwell H. Hill
BY Harold E. Stonebraker
ATTORNEY Patented July 14, 1936

2,047,478

UNITED STATES PATENT OFFICE 2,047,478

PAPER FEEDING AND CUTTING MECHANISM

Whitten P. Lloyd and Maxwell H. Hill, Rochester, N. Y., assignors to The Haloid Company, Rochester, N. Y., a corporation of New York Application October 28, 1935, Serial No. 47,002

26 Claims. (Cl. 95—1)

This invention relates to a paper feeding and cutting mechanism that is applicable to a photo copy machine of the general type in which there is a variable exposure opening made possible by an adjustable curtain, paper being fed from a supply roll past the exposure opening, and it has for its object to afford a mechanism for permitting ready, efficient and accurate control of the curtain positioning, paper feeding, and paper cutting operations.

The invention has to do more particularly with a machine having provision for feeding and cutting off, after each exposure, an amount of paper corresponding to the size of the exposure opening as determined by the position of the curtain, and a specific purpose of this invention is to afford a satisfactory automatic mechanism which after being set in motion by the operator, functions to feed down automatically a correct amount of paper in accord with the position of the previously adjusted curtain, with facilities also enabling the operator, if he desires, by a further manual operation to cause the automatic mechanism to perform the cutting operation after the paper is fed.

In general, the invention comprehends devices which automatically operate the paper feed drive shaft first in one direction and then in the opposite direction returning it to initial position, and an additional purpose of the invention is to provide apparatus of such a character that the extent of movement of the paper feeding mechanism is extremely accurate as determined by the curtain setting, so that as a result there is practically no waste of paper.

A further purpose of the improvement is to provide a simple and efficient arrangement of parts whereby a power shaft can be utilized to first position the curtain in any desired position, and subsequently to operate the paper feeding and cutting mechanisms successively, each of these operations being automatically performed after the operator sets the mechanism in motion by movement of a suitable controlling instrumentality.

Another object of the invention is to provide mechanism that enables the operator to bring about repeated paper feeding operations without cutting the paper after each feeding movement if desired, and which at the same time permits the operator by an additional operation, after the feeding operation is completed, to bring about action of the paper cutting means, these functions being selectively performed either with the curtain remaining in one adjusted position for repeated exposures, or permitting the curtain to be adjusted at the will of the operator after each exposure.

To these and other ends, the invention comprises the construction and arrangement of parts that will appear clearly from the following description when read in conjunction with the accompanying drawings, the novel features being pointed out in the claims following the specification.

In the drawings:

Fig. 5 is a vertical sectional view on the line 5—5 of Fig. 1;

Fig. 6 is a vertical sectional view on the line 6—6 of Fig. 1;

Fig. 7 is a horizontal sectional view on the line 7—7 of Fig. 1, showing the shiftable gear control to the curtain drive shaft in neutral position;

Fig. 8 is a similar view showing the gear control shifted to move the curtain upwardly;

Fig. 9 is a similar view showing the gear control shifted to move the curtain downwardly;

Fig. 10 is a horizontal sectional view on the line 10—10 of Fig. 1;

Figure 1:
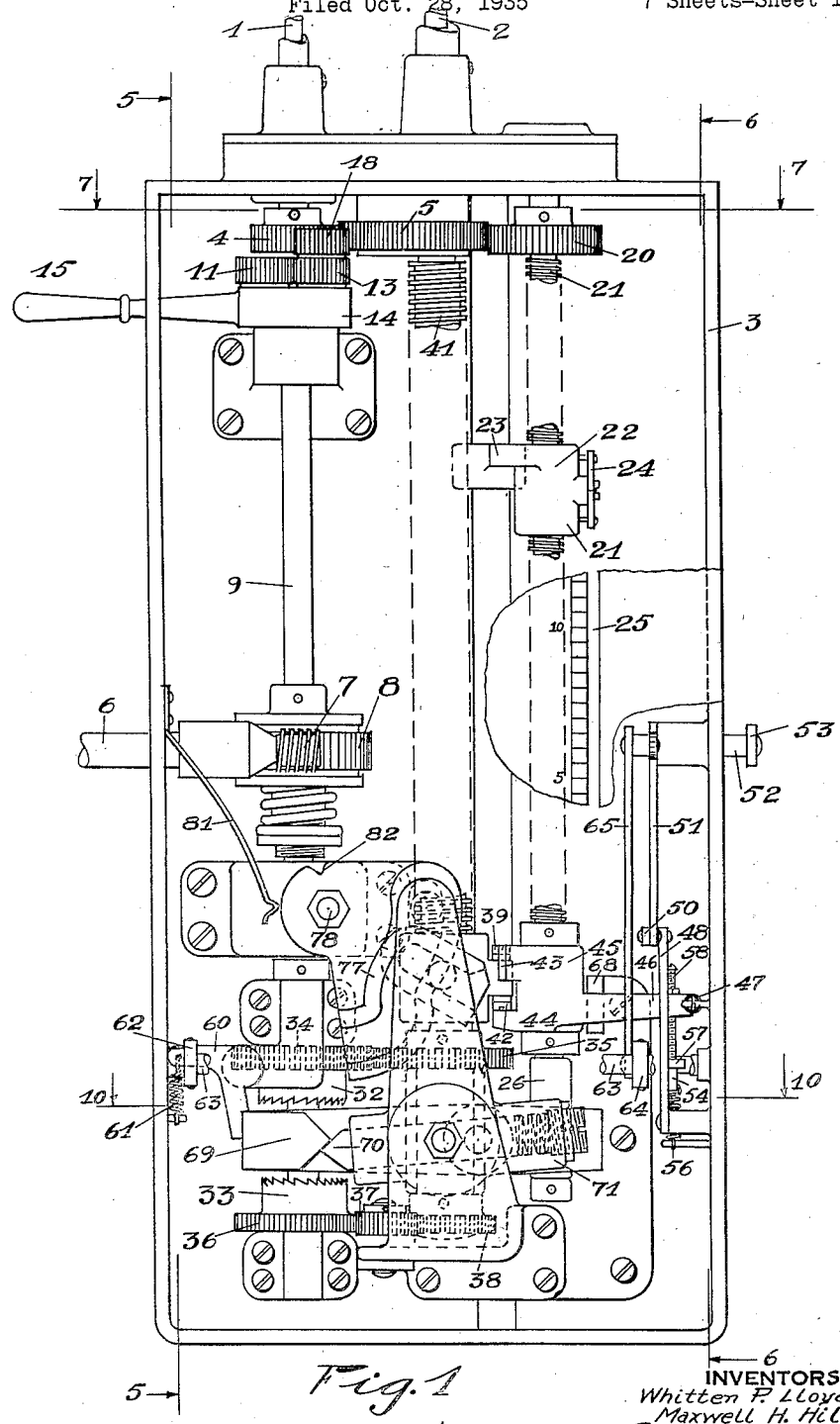
Fig. 1 is a front elevation of a control mechanism incorporating a preferred embodiment of the invention, the structure being shown removed from the photo copy machine with which it is designed to control, and the parts of the reversing mechanism appearing in neutral or inoperative position after having moved to effect the paper cutting operation.

The mechanism disclosed herein is adapted for application to a photo copy machine such as illustrated in application filed July 19, 1935, Serial No. 32,246, Patent No. 2,043,004, dated June 2, 1936. In the structure shown therein, there is a shaft adapted to be turned manually for adjusting the curtain in either direction, and another shaft adapted to be turned manually and which when rotated in one direction causes feeding of the paper and when rotated in the opposite direction restores the paper feeding parts to initial position, continued movement of the last named shaft in the reverse direction causing the paper cutting instrumentalities to operate, after which the parts are ready for another paper feeding operation.

The structure of the present application is designed to afford power means for operating the above mentioned shafts, and automatic mechanism which when set in operation causes the paper feeding shaft to turn first in one direction and then in the other, the extent of forward movement of the paper feeding shaft being dependent upon the position of the curtain and the extent of its reverse movement being under the operator's control, all of these operations being governed through suitable levers, to connect the power drive to the curtain or to the paper feeding and cutting devices, and it is deemed unnecessary to disclose in this application the conventional parts of a photo copy machine or the curtain positioning and paper feeding and cutting instrumentalities which form a part of said prior application, inasmuch as the present invention has to do entirely with the power drive and the automatic control mechanism that is utilized to operate the curtain positioning and paper feeding and cutting devices.

The structure hereinafter to be described is arranged within a control box mounted at a suitable point on the photo copy machine and includes a drive shaft 1 which is flexibly or otherwise connected to the curtain positioning instrumentalities so that when the drive shaft 1 is turned in one direction, it opens the curtain, and when turned in the opposite direction it returns the curtain to closed position, and a second drive shaft 2 which is flexibly or otherwise connected to the paper feeding and cutting devices so that when turned in one direction, it feeds the paper to an extent determined by the position of the curtain, as will be further described later on, and when turned in the opposite direction, it returns the paper feeding devices to initial position and also, when desired, can be moved further in a reverse direction to operate the paper cutting devices. The structure now to be described has to do with the power mechanism for turning the first mentioned drive shaft 1 in either direction to adjustably position the curtain and thereafter, upon operation of a control device by the operator, setting in operation an automatic reversing mechanism that turns the shaft 2 first in one direction to an extent determined by the position of the curtain and then in the other direction to return it to initial position, or if the operator desires, to continue such reverse movement to effect cutting of the paper.

The parts to be described are mounted within the control box 3, the curtain drive shaft 1 being provided at its lower end with a pinion 4 that is engaged and driven by the ring gear 5, and the latter is adapted to be turned in either direction by the operator through a shiftable gear control mechanism, as will now be described.

The power shaft is designated at 6, being operated continuously by an electric motor or otherwise, and carrying a worm 7 that engages and drives a worm gear 8 on the vertical shaft 9. The latter at its upper end carries a gear 10, see Figs. 5 and 7 to 9, and said gear 10 engages and drives pinions 11 and 12, the pinion 11 in turn engaging and driving an idler pinion 13. The pinions 11, 12, and 13 are journalled in a suitable shiftable frame or support 14 which carries a handle 15 extending through an opening 16 in the box 3, the handle 15 being held in neutral position by any suitable means such as spring actuated detents 17 and movable by the operator in one direction or the other to adjust the curtain to any desired position. Pinion 13 is mounted on an arbor which carries above it a pinion 18, while pinion 12 is mounted on an arbor which carries above it a pinion 19, the pinions 18 and 19 being in a plane to engage with the aforementioned ring gear 5 when the gear control mechanism is shifted in one direction or the other away from the neutral position illustrated in Fig. 7. When the handle 15 is moved in an anti-clockwise direction by the operator, the frame 14 and the pinions mounted thereon are shifted to the position shown in Fig. 8, in which the ring gear 5 is driven in a clockwise direction by the pinions 11, 13, and 18, causing the curtain to move upwardly as long as the lever 15 is held in such position by the operator. To move the curtain in a downward direction to close the exposure opening more or less, the operator moves lever 15 in a clockwise direction from its neutral position, causing the gears to assume the position shown in Fig. 9, in which gears 12 and 19 effect movement of the ring gear 5 in an anti-clockwise direction. It will be understood that the ring gear 5 transmits its movement to the gear 4 which it engages, and which is on the drive shaft to the curtain operating mechanism.

It is essential in this construction to control the paper feeding instrumentalities through a means that is variably positioned, dependent upon the location of the curtain, and this result is effected through an adjustable stop that cooperates with the paper feed control devices in a manner that will appear later, and is always moved when the curtain is moved, its relative position being changed in accordance with any change in the position of the curtain. The mechanism to accomplish this includes a gear 20, see Fig. 1, engaging and driven by the aforementioned ring gear 5, and fixedly mounted on a screw 21. 22 is a nut engaging the screw 21 and movable endwise thereon when the latter is rotated, the nut 22 being held against rotational movement in any convenient manner and carrying a stop 23 which determines the extent of movement of the paper feed drive shaft, as will appear presently.

From the foregoing description, it will be seen that the movable stop 23 is always located in accordance with the position of the curtain, being moved upwardly or downwardly by the screw 21 whenever the curtain is correspondingly adjusted, and remaining in such position until the location of the curtain is changed. The operator is enabled to determine the position of the curtain at any time by a suitable indicator 24 that is secured to the nut 22 and extends through a slot 25 in the cover of the control box, the indicator travelling in said slot when the nut is adjusted by movement of the curtain, and cooperating with a suitable indicating scale on the exterior of the gear box so as to afford to the operator a constant indication of the position of the curtain.

The screw 21, and stop 23 adjustable thereon, are supported on a movable clutch carrier, and the screw 21 is shifted endwise in one direction or the other by movable controlling stops, to actuate the clutch carrier and through it the reversing mechanism to the paper feed drive shaft. To accomplish this, the screw shaft 21 is mounted in a bearing at its upper end to permit endwise movement from its Fig. 3 to its Fig. 4 positions, and is rotatively supported at its lower end in a block 26, see Figs. 1 and 10, which latter is pivotally supported in suitable trunnions of a yoke 27 in one end of the movable clutch carrier.

The clutch carrier is designated generally at 28, and is preferably pivotally supported on a post or other suitable support 29, the other end of the clutch carrier including a yoke 30 between the arms of which is rotatably supported the shiftable clutch element 31 adapted to engage with the non-shiftable clutch elements 32 and 33 located above and below the shiftable clutch element 31, see Fig. 3. The clutch element 31 is slidably keyed on the power shaft 9, while clutch elements 32 and 33 are concentrically and rotatably mounted on the power shaft 9. Clutch element 32 carries the gear 34 which engages gear 35, while clutch element 33 carries gear 36 which engages the idler gear 37 that in turn engages and drives gear 38. The gears 35 and 38 are fixedly mounted on the screw shaft 41 which is fixedly connected to drive shaft 2 that extends through the ring gear 5 to the paper feed devices and is driven in opposite directions alternately from the gears 34 and 36 when the clutch element 31 is shifted.

The shiftable clutch element 31 is normally in the neutral position shown in Figs. 1 and 5, and when released by the operator, in a manner that will be described later, the clutch carrier is initially moved to actuate the clutch element 31 upwardly to the position shown in Fig. 3, which causes the paper feed drive shaft to turn and operate the paper feed mechanism until the clutch carrier is moved in the opposite direction to cause reverse movement of the paper feeding drive shaft and to restore the parts to normal position. This automatic reversal of movement of the paper feed drive shaft 2 is brought about by a stop 39 mounted on a nut 40 which travels along the screw 41 rotating with the drive shaft 2.

Figure 3:
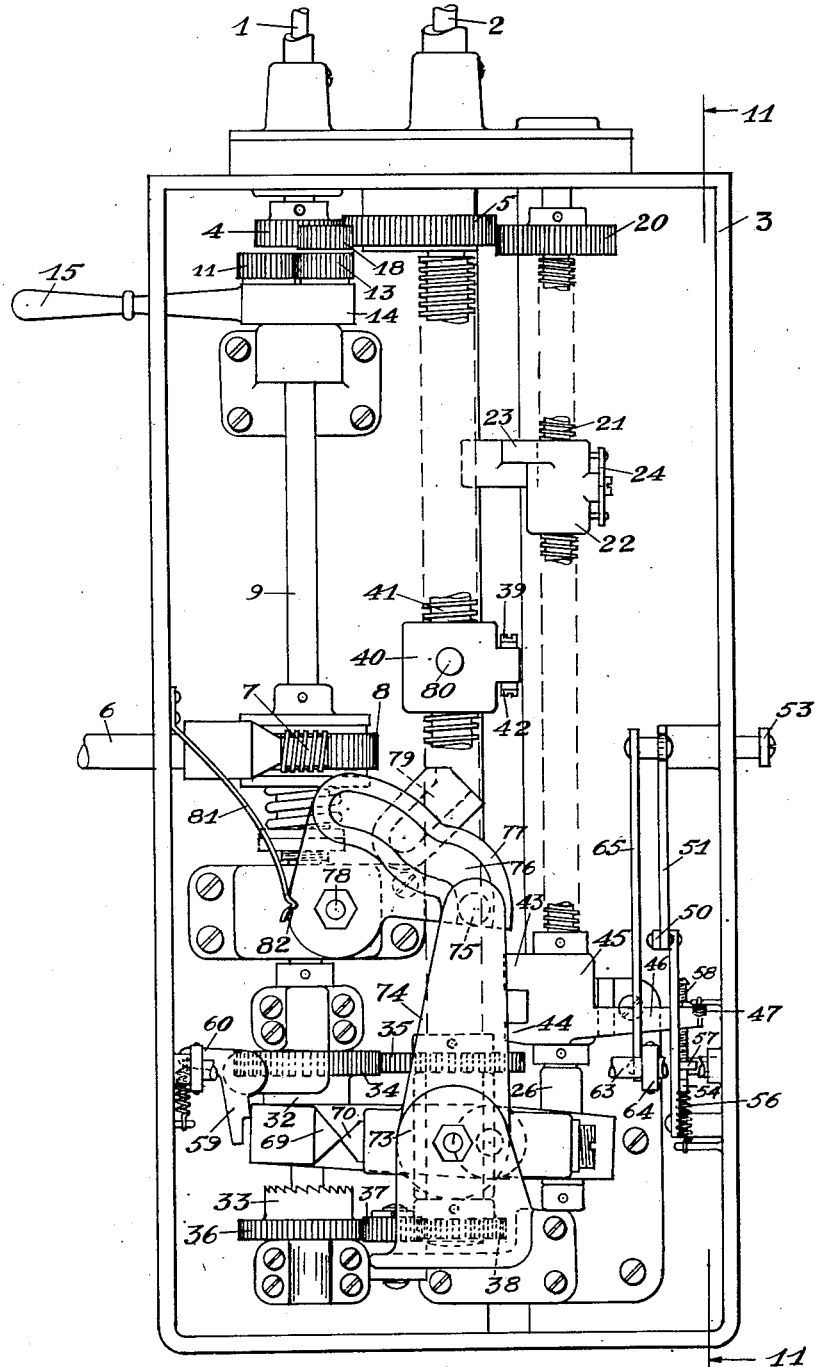
Fig. 3 is a similar view showing the position of the parts when the clutch element is moved in the direction to effect necessary forward movement of the drive shaft to the paper feed mechanism.
Figure 4:
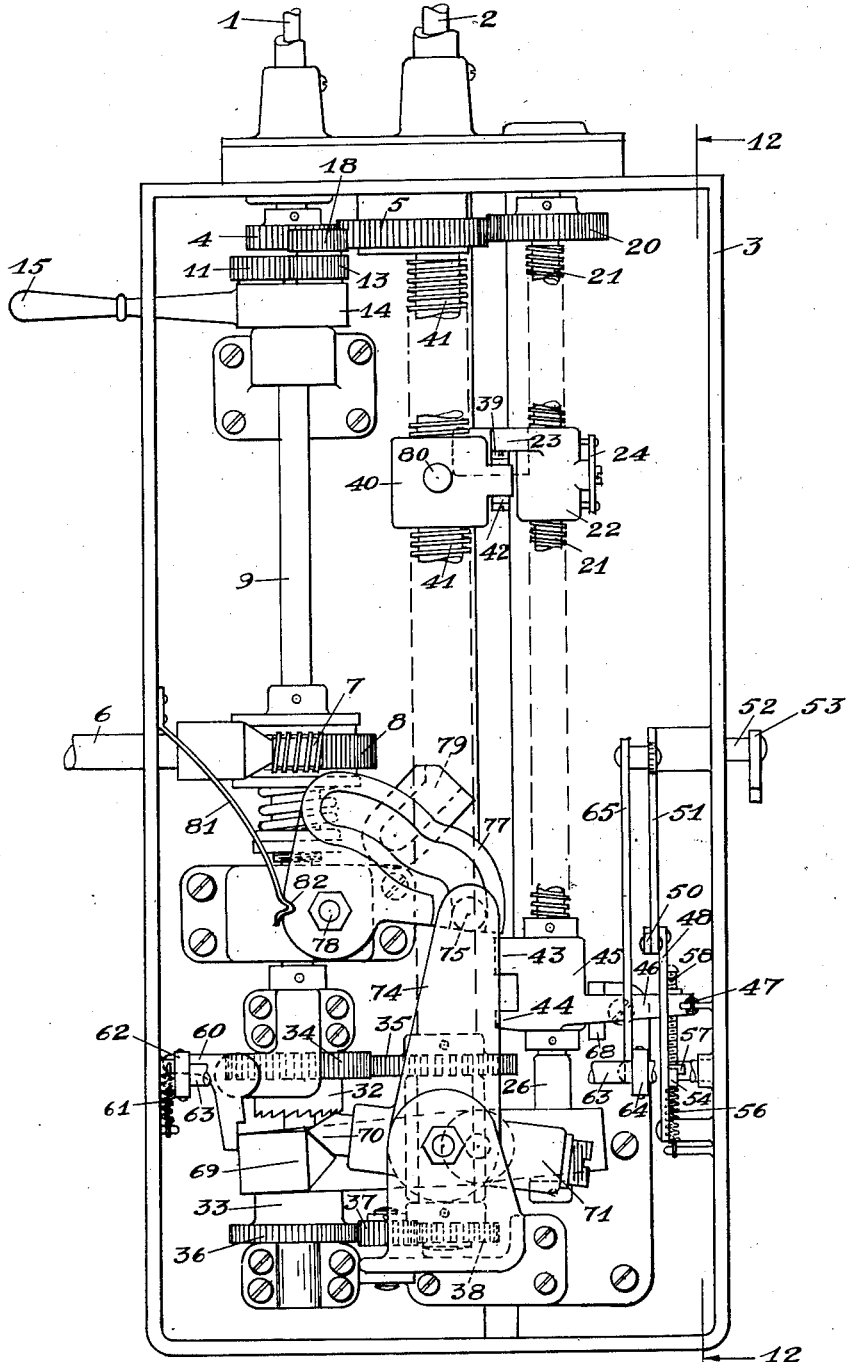
Fig. 4 is a similar view showing the position of the parts immediately after the paper feed drive shaft has moved sufficiently to complete the paper feeding operation, the movable clutch element having been shifted to its opposite position to effect return movement of the paper feed drive shaft to initial position.

As the drive shaft 2 is turned to effect feeding of the paper, the stop 39 travels upwardly from the position shown in Fig. 1 until it strikes the stop 23 on screw 21, thereby lifting stop 23 and with it the screw 21 and elevating the outer end of the clutch carrier to swing the movable clutch element 31 from the uppermost position illustrated in Fig. 3 to the lowermost position illustrated in Fig. 4, which indicates the position of the parts just after the stop 39 has reached the limit of its upward movement and effected the shifting operation. The screw 41 then turns in the opposite direction, causing nut 40 and stop 42 to travel downwardly until the latter engages a stop at the lower end of screw 21, actuating the latter downwardly and with it the outer end of the clutch carrier and restoring the shiftable clutch element to neutral position.

The extent of reverse movement of the paper feed drive shaft is determined selectively by stops 43 and 44 which are arranged on a stop carrier 45 in offset vertical alinement, the stop carrier 45 being rotatably mounted at the bottom of the screw 21, and rotatably adjustable thereon by the operator to position either stop 43 or stop 44 in the path of the stop 42. When the stop 43 is thus positioned, the paper feed drive shaft 2 is returned to normal position without effecting the cutting operation of the paper, and where it is desirable also to effect cutting, the operator shifts the stop carrier 45 to move stop 43 from the path of stop 42 and to position stop 44 in the path of stop 42, as shown in Fig. 1, which permits further downward movement of the stop 42 and consequent further reverse movement of the drive shaft 2 sufficient to effect operation of the paper cutting instrumentalities before restoring the clutch element to neutral position.

Figure 2:
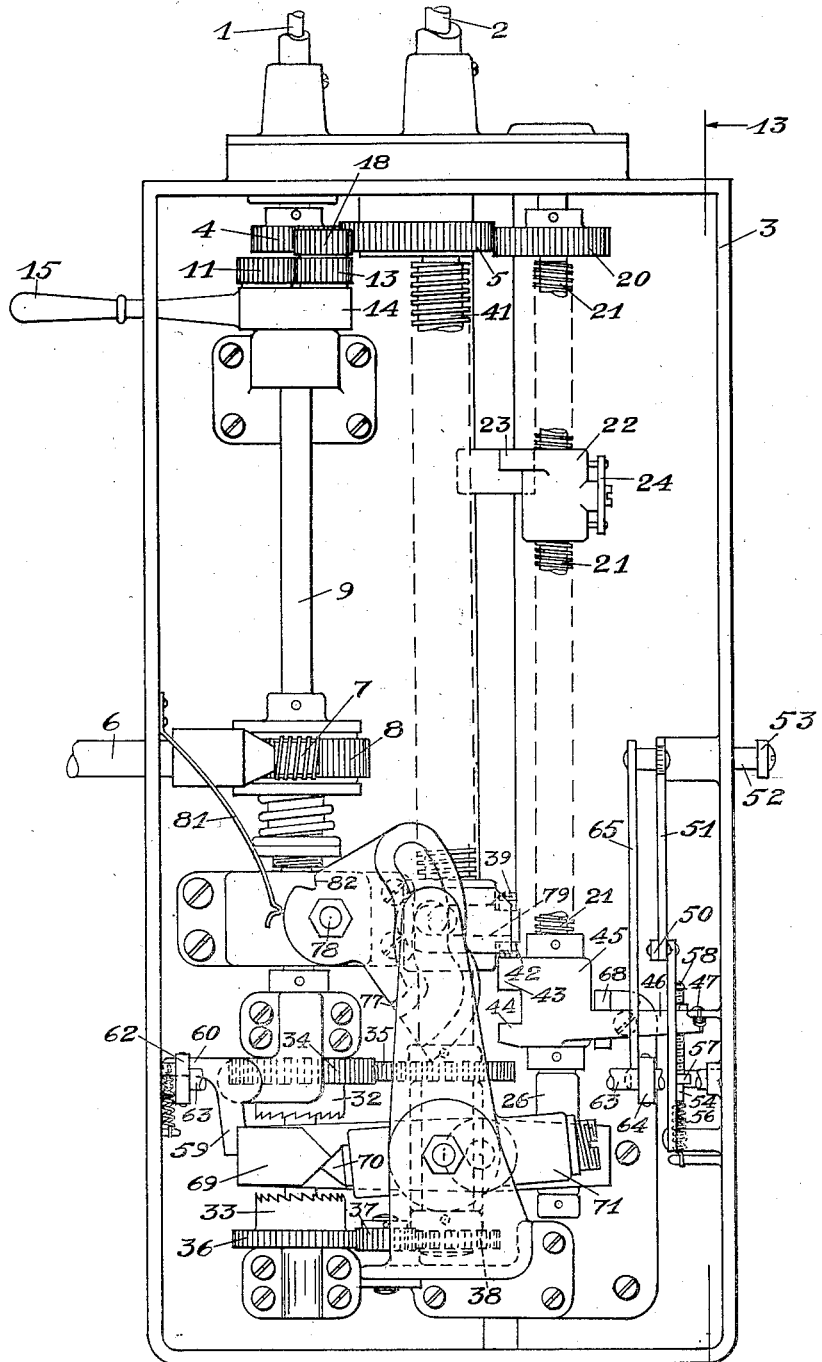
Fig. 2 is a similar view, with the reversing mechanism in neutral or inoperative position, and illustrating the position assumed by these parts when the reversing mechanism stops after completion of the paper feeding operation and before performing the paper cutting operation.

To permit such control of the stop carrier 45, the latter is provided with an arm 46, see Figs. 4, 6, and 11 to 13, to which is connected a spring 47 which holds the stop carrier normally in the position illustrated in Fig. 2 with the stop 43 in position to effect shifting of the clutch carrier. Adjustment of the stop carrier 45 rotatively on the screw 21 is effected by a lever 48 pivoted at 49, see Figs. 11 to 13, and connected by a link 50 to a bell crank 51 which is fixed on an arbor 52, the latter extending through a wall of the control box and having a handle 53 at its outer end.

Figure 11:
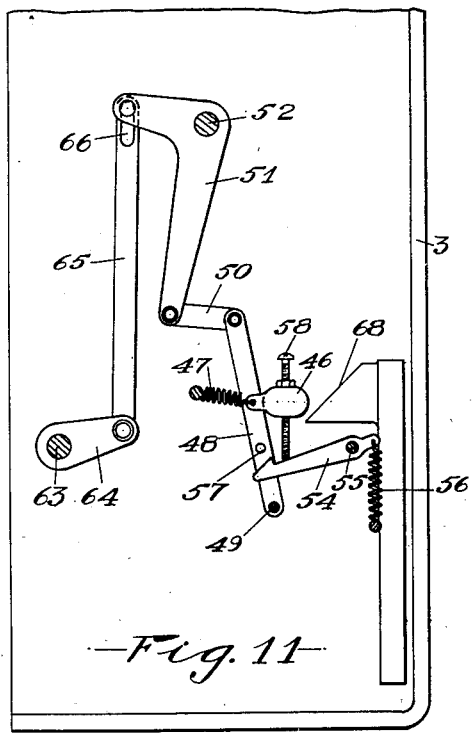
Fig. 11 is a vertical sectional view on the line 11—11 of Fig. 3, showing the position of the parts when the control lever is moved to release the clutch carrier to permit the reversing mechanism to function.
Figure 12:
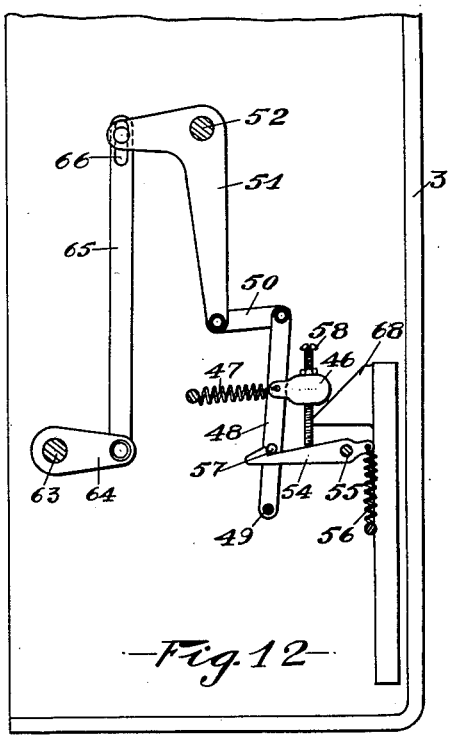
Fig. 12 is a similar view showing the position of the control lever and its associated parts when the lever has been moved, after completion of the forward movement of the paper feed drive shaft, to cause reverse movement of the drive shaft sufficiently to effect the paper cutting operation.

The operator, by engaging handle 53 and turning arbor 52, may shift the parts from the position shown in Fig. 11 to that shown in Fig. 12, thus turning the stop carrier 45 to permit operation of the paper cutting instrumentalities. The stop carrier may be held in this position by a latch 54 pivoted at 55 and controlled by a spring 56. The latch 54 engages a pin 57 on the link 48 and acts to hold the parts in the position shown in Fig. 12 until the stop 42 engages stop 44, causing downward movement of the screw 21 and the stop carrier 45 and thus releasing the latch 54 through engagement by a pin 58 which is threaded for adjustment on the arm 46.

The pin 58 also functions to prevent the latch 54 from engaging pin 57 during the forward movement of the drive shaft 2 for paper feeding, since during this movement of the drive shaft 2, the screw 21 and stop carrier 45 are in their lowermost position illustrated in Figs. 3 and 11, the pin 58 engaging latch 54 and holding it down. As soon as the stop 39 engages stop 23, the screw 21 and stop carrier 45 are elevated as the reverse movement takes place, lifting pin 58 correspondingly, as shown in Fig. 12, and the latch 54 is then free to engage pin 57 and hold the stop carrier in the adjusted position shown in Fig. 12, after the operator has effected such shifting of the stop carrier by moving the handle 53 to turn arbor 52. The parts then remain in the position illustrated in Fig. 12 until stop 42 in its downward travel engages stop 44, moving the screw 21 and stop carrier 45 downwardly, so that the pin 58 effects downward movement of the latch 54, releasing pin 57, whereupon the spring 47 restores the stop carrier to its normal position.

The clutch carrier is held in neutral position by the latch 59, see Fig. 1, forming part of a rock arm which carries a tail piece 60 to which a spring 61 is connected that holds the latch in normal or locking position. The tail piece 60 is arranged to be actuated by an arm 62, see Fig. 5, fixed on a rock shaft 63 which at its opposite end has fixed thereto an arm 64 pivotally connected to a link 65 provided with a slot 66 which is engaged by a pin 67 on the aforementioned bell crank 51. Thus the operator, by turning the handle 53 in one direction, is enabled to release the latch 59 and permit the shiftable clutch element to move upwardly, while movement of the handle 53 in the opposite direction effects the necessary shifting of the stop carrier 45 when it is desired to operate the paper cutting instrumentalities by continued movement of the paper feed drive shaft 2 in the reverse direction.

If the operator does not wish to actuate the paper cutting instrumentalities each time the paper is fed, he does not shift the stop carrier 45, and the shiftable clutch element will be restored to neutral position when stop 42 engages the stop 43 at the top of the stop carrier 45. In either event, the clutch carrier is restored to neutral position and automatically held there by the latch 59 when stop 42 engages the selected stop 43 or 44, and the parts are then ready for another operation, which takes place when the operator again actuates the handle 53 to release the latch 59.

Figure 13:
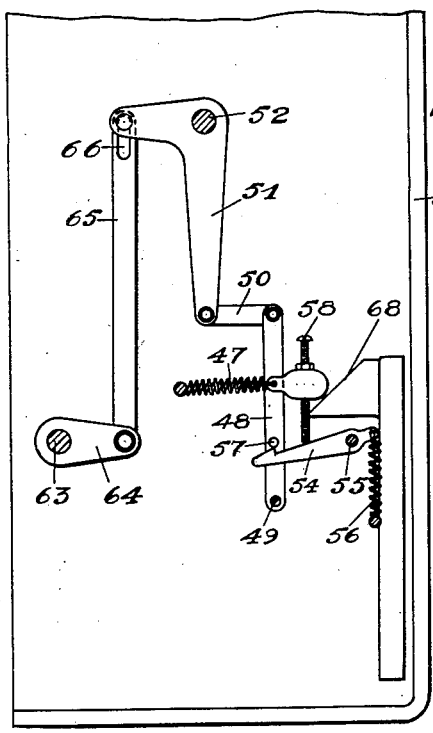
Fig. 13 is a similar view showing the position of the control lever and associated parts during the movement of the drive shaft forwardly while the paper feeding operation is performed.
Figure 14:
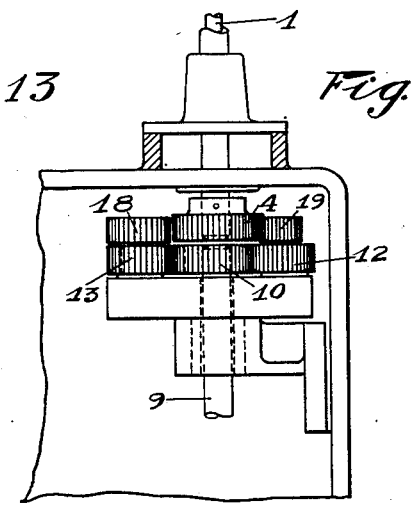
Fig. 14 is a vertical sectional view on the line 14—14 of Fig. 7.

In case the operator wishes to effect further reverse movement of the drive shaft 2 after the latter has come to a stop, to effect the paper cutting operation, or wishes at any time during the forward movement of the drive shaft 2 to at once reverse its movement before the controlling stops function, this is accomplished by a stationary cam 68, see Figs. 11 to 13, located in the path of arm 46. By operating handle 53 and turning arbor 52 forcibly, the arm 46 is forced against cam 68 and thereby moved upwardly, carrying upwardly with it the screw 21 and thus elevating the outer end of the clutch carrier and shifting the movable clutch element downwardly into engagement with the reversing clutch 33.

When the latch 59 is moved to release the clutch carrier, means are provided to move the latter so as to shift the movable clutch element upwardly, and this is accomplished in the following manner. The clutch carrier is provided with a tapered cam 69, the opposite surfaces of which are alternately engaged by a spring actuated follower 70, the operative end of the follower 70 being preferably tapered, to cooperate with the opposite surfaces of the cam 69. The follower 70 may be of any convenient construction, and is arranged within a barrel 71 which contains a spring that forces the follower toward the cam 69.

Said barrel and spring actuated follower 70 are mounted upon a holder 72 that is pivoted on a stationary bracket 73, see Fig. 6, and carries an upstanding arm 74 provided with a pin 75 which engages a cam slot 76 in a cam 77, the latter being pivotally mounted at 78 and provided on its opposite side with a cam slot 79 arranged to be engaged by a pin 80 on the aforementioned nut 40. 81 is a spring, the free end of which is arranged to engage a notch 82 in the pivoted cam to hold the latter in its uppermost position, as shown in Fig. 3.

With the parts normally in the position shown in Fig. 1, when latch 59 is released by the operator in the manner already described, the spring follower 70 engaging the lower surface of the cam 69 forces the cam and the corresponding end of the clutch carrier upwardly, moving the shiftable clutch element into the position shown in Fig. 3. During the forward movement of the drive shaft 2 and screw 41, the nut 40 travels upwardly, and pin 80, which is engaged with cam slot 79, swings the cam 77 from the position shown in Fig. 1 to that shown in Fig. 3 spring 81 then holding the cam in its upermost position. During the movement of the parts just described, the cam slot 76 engaging pin 75 on the arm 74 moves the latter, and with it the barrel and spring actuated follower from the position shown in Fig. 1 to the position shown in Fig. 3, the follower having been moved upwardly along the lower surface of the cam 70 until it is just adjacent to the point of the cam, being still in position to hold the shiftable clutch element in its uppermost position but so close to the extreme point of the cam that a minimum amount of power is required to shift the clutch carrier.

When the stop 39 travelling upwardly reaches the stop 23, the screw 21 is elevated and with it the outer end of the clutch carrier, thus forcing the cam 69 downwardly against the action of the spring follower until the latter snaps past the point of the cam 69 and engages the upper surface of the cam, whereupon it immediately forces the shiftable clutch element to its lowermost position. Downward movement of the nut 40 and pin 80 causes movement of the cam 77 and spring actuated follower the reverse of that just described until they again reach the position shown in Fig. 1, the stop 42 having engaged one of the stops 43 or 44, and moved the screw 21 and outer end of the clutch carrier downwardly. Such upward movement is stopped by the latch 59 which is normally held in the path of the clutch carrier by the spring 61, and retains the clutch carrier in neutral position. The parts then remain idle until the operator is ready to effect a further paper feeding operation, which is brought about by again manipulating the handle 53 and moving latch 59 away from engagement with the clutch carrier.

While the invention has been described with reference to certain details of construction as herein disclosed, it is not confined to the precise arrangement or combination of parts set forth, and this application is intended to cover any modifications or departures coming within the purposes of the improvements or the scope of the following claims.

We claim:

1. The combination with a drive shaft, of an adjustable stop positionable in accordance with the extent of movement of said drive shaft, a second drive shaft, and automatic reversing mechanism which when set in operation moves the last mentioned drive shaft in one direction to an extent dependent upon the position of said stop and then returns it to initial position.

2. The combination with a drive shaft, of a screw operated in accordance with the movement of said drive shaft, a stop controlled by said screw, a second drive shaft, and automatic reversing mechanism which when set in operation moves the last mentioned shaft in one direction to an extent determined by said stop and then returns it to initial position.

3. The combination with a power shaft, of a drive shaft, manually controlled gearing for connecting the power shaft with said drive shaft to move the latter in either direction, a second drive shaft, an adjustable stop operatively connected to the first mentioned drive shaft and positionable in accordance with the movement of the latter, and reversing mechanism connecting said power shaft and the last mentioned drive shaft and acting when set in operation to turn said latter drive shaft in one direction an extent dependent upon the position of said stop and then to return said last mentioned drive shaft to initial position.

4. The combination with a power shaft, of a drive shaft, manually controlled gearing for connecting the power shaft with said drive shaft to move the latter in either direction, a screw operatively connected to said drive shaft, a stop controlled by said screw, a second drive shaft, a reversing mechanism for connecting the power shaft with the last mentioned drive shaft and acting when set in operation to move the latter first in one direction and then in the other, a screw rotatable with the last mentioned drive shaft, and a stop controlled by the last mentioned screw and cooperating with the first mentioned stop to determine the extent of rotation of the last mentioned drive shaft before reversing.

5. The combination with a power shaft, of a drive shaft, a second drive shaft, reversing mechanism connecting said power shaft with said second drive shaft and including a movable clutch carrier and a clutch element carried thereby, means controlled by movement of said second drive shaft for operating said movable clutch carrier to disengage said clutch element, and means acting automatically after the clutch element is disengaged to move said clutch carrier toward its opposite position.

6. The combination with a power shaft, of a drive shaft, a second drive shaft, reversing mechanism connecting said power shaft with said second drive shaft and including a movable clutch carrier and a clutch element carried thereby, means controlled by movement of said second drive shaft for operating said movable clutch carrier to disengage said clutch element, and spring controlled actuating means cooperating with said clutch carrier to effect its movement after said clutch element is disengaged to move the latter to opposite position.

7. The combination with a power shaft, of a drive shaft, a second drive shaft, reversing mechanism connecting said power shaft with said second drive shaft and including a movable clutch carrier and a clutch element carried thereby, means controlled by movement of said second drive shaft for operating said movable clutch carrier to disengage said clutch element, spring controlled actuating means cooperating with said clutch carrier to effect its movement after said clutch element is disengaged to move the latter to its opposite position, and means controlled by said second drive shaft for governing the position of said spring controlled actuating means.

8. The combination with a power shaft, of a drive shaft, a second drive shaft, reversing mechanism connecting said power shaft with said second drive shaft and including a movable clutch carrier and a clutch element carried thereby, a rotatable screw supported on said clutch carrier and operated with said first drive shaft, a stop adjustable on said screw, a second screw rotatable with said second drive shaft, and a stop movable on said second screw and cooperating with said stop on the first mentioned screw to move the clutch carrier and disengage said clutch element.

9. The combination with a power shaft, of a drive shaft, a second drive shaft, reversing mechanism connecting said power shaft with said second drive shaft and including a movable clutch carrier and a clutch element carried thereby, a rotatable screw supported on said clutch carrier and operated with said first drive shaft, a stop adjustable on said screw, a second screw rotatable with said second drive shaft, a stop movable on said second screw and cooperating with said stop on the first mentioned screw to actuate the clutch carrier to disengage said clutch element, and independent means for actuating the clutch carrier after it is disengaged.

10. The combination with a power shaft, of a drive shaft, a second drive shaft, reversing mechanism connecting said power shaft with said second drive shaft and including a movable clutch carrier and a clutch element carried thereby, a rotatable screw supported on said clutch carrier and operated with said first drive shaft, a stop adjustable on said screw, a second screw rotatable with said second drive shaft, a stop movable on said second screw and cooperating with said stop on the first mentioned screw to actuate the clutch carrier to disengage said clutch element, and spring controlled actuating means for effecting additional movement of the clutch carrier after it is disengaged.

11. The combination with a power shaft, of a drive shaft, a second drive shaft, reversing mechanism connecting said power shaft with said second drive shaft and including a movable clutch carrier and a clutch element carried thereby, a rotatable screw mounted on said clutch carrier and operated with said first drive shaft, a stop adjustable on said screw, a second screw rotatable with said second drive shaft, a stop movable on said second screw and cooperating with said stop on the first mentioned screw to actuate the clutch carrier to disengage said clutch element, a spring actuated follower cooperating with said clutch carrier to move it after it is disengaged, and means controlled by movement of said second drive shaft for effecting movement of said follower so as to position it for instantaneous action after disengagement of the clutch element.

12. The combination with a power shaft, of a drive shaft, a second drive shaft, reversing mechanism connecting said power shaft with said second drive shaft and including a movable clutch carrier and a clutch element carried thereby, a cam surface carried by said clutch carrier, a spring actuated follower adapted to engage opposite portions of said cam surface alternately to move the carrier after disengagement of the clutch, a cam operated by said second drive shaft and controlling the position of said spring actuated follower, a rotatable screw mounted on said clutch carrier and operated with said first drive shaft, an adjustable stop on said screw, a second screw operated with said second drive shaft, and a stop movable on the last mentioned screw and cooperating with the stop on the first mentioned screw to move the clutch carrier and disengage said clutch element.

13. The combination with a power shaft, of a drive shaft, a second drive shaft, reversing mechanism connecting said power shaft with said second drive shaft and adapted when set in operation to move said drive shaft first in one direction and then in the other and including a movable clutch carrier, a screw mounted on the clutch carrier and movable with the first drive shaft, a stop adjustable on said screw, a stop carrier rotatably mounted and held against longitudinal movement on said screw and provided with a plurality of stops, a second screw rotatable with said second drive shaft, a stop movable on said second screw and cooperating with the stops on the first mentioned screw, means for selectively positioning said stop carrier to vary the extent of reverse movement of the second drive shaft comprising an arm mounted on the stop carrier, and manually controlled devices for shifting said arm to turn the stop carrier on its support.

14. The combination with a power shaft, of a drive shaft, a second drive shaft, reversing mechanism connecting said power shaft with said second drive shaft and adapted when set in operation to move said drive shaft first in one direction and then in the other and including a movable clutch carrier, a screw mounted on the clutch carrier and movable with the first drive shaft, a stop adjustable on said screw, a stop carrier rotatably mounted and held against longitudinal movement on said screw and provided with a plurality of stops, a second screw rotatable with said second drive shaft, a stop movable on said second screw and cooperating with the stops on the first mentioned screw, means for selectively positioning said stop carrier to vary the extent of reverse movement of the second drive shaft comprising an arm mounted on the stop carrier, manually controlled devices for shifting said arm to turn the stop carrier on its support, said last mentioned means including a lever engageable with said arm, and a latch engageable with said lever to hold the stop carrier in such adjusted position until its lowermost stop is engaged by the stop on said second screw.

15. The combination with a power shaft, of a drive shaft, a second drive shaft, reversing mechanism connecting said power shaft with said second drive shaft and adapted when set in operation to move said drive shaft first in one direction and then in the other and including a movable clutch carrier, a screw mounted on the clutch carrier and movable with the first drive shaft, a stop adjustable on said screw, a stop carrier rotatably mounted and held against longitudinal movement on said screw and provided with a plurality of stops, a second screw rotatable with said second drive shaft, a stop movable on said second screw and cooperating with the stops on the first mentioned screw, means for selectively positioning said stop carrier to vary the extent of reverse movement of the second shaft comprising an arm mounted on the stop carrier, manually controlled devices for shifting said arm to turn the stop carrier on its support, said last mentioned means including a lever engageable with said arm, a latch engageable with said lever to hold the stop carrier in such adjusted position until its lowermost stop is engaged by the stop on said second screw, and means carried by said arm and engageable with said latch acting to hold the latter in inoperative position until after said second screw has started its reverse movement.

16. The combination with a power shaft and a drive shaft, of reversing mechanism for connecting said shafts comprising a screw rotating with said drive shaft and a stop movable thereon, a pivoted clutch carrier and a clutch element mounted thereon, a screw mounted on the clutch carrier and having stationary and adjustable stops thereon, the first mentioned stop cooperating with the last mentioned stops to move the clutch carrier in opposite directions, and a pivoted spring actuated follower engageable with the clutch carrier for actuating it in opposite directions after the clutch element is disengaged.

17. The combination with a power shaft and a drive shaft, of reversing mechanism for connecting them comprising a screw rotating with the drive shaft, a pivoted clutch carrier and a clutch element mounted thereon, a tapered cam on said clutch carrier, a spring actuated follower movable along and engageable alternately with opposite surfaces of said tapered cam, a pivoted holder for said follower, and means controlled by the movement of said screw for shifting the position of said holder so as to bring said follower close to the tip of said cam immediately before shifting of the clutch carrier.

18. The combination with a power shaft and a drive shaft, of reversing mechanism for connecting them comprising a screw operated with the drive shaft, a pivoted clutch carrier and a clutch element mounted thereon, a tapered cam on said clutch carrier, a spring actuated follower movable along and engageable alternately with opposite surfaces of said tapered cam, a pivoted holder for said follower, a pivoted cam engageable with and controlling the movement of said holder, and a nut movable on said screw cooperating with and controlling the movement of the last mentioned cam.

19. The combination with a power shaft and a drive shaft, of reversing mechanism for connecting them comprising a screw rotating with the drive shaft, a pivoted clutch carrier and a clutch element mounted thereon, a tapered cam on said clutch carrier, a spring actuated follower movable along and engageable alternately with opposite surfaces of said tapered cam, a pivoted holder for said follower, a pivoted cam engageable with and controlling the movement of said holder, a nut movable on said screw cooperating with and controlling the movement of said cam, a stop also carried by said nut, a second screw mounted on the clutch carrier, adjustable and stationary stops on said screw, and a manually controlled spring actuated latch engageable with the clutch carrier for holding the same with its clutch element in neutral position.

20. The combination with a power shaft, of a drive shaft, a second drive shaft, reversing mechanism connecting said power shaft with said second drive shaft and including a movable clutch carrier, a screw mounted on the clutch carrier and rotatable with the first drive shaft, a stop adjustable on said screw, a stop carrier rotatably mounted and held against longitudinal movement on said screw and provided with a plurality of stops, a second screw rotatable with said second drive shaft, a stop movable on said second screw and cooperating with the stops on the first mentioned screw, means for selectively positioning said stop carrier to vary the extent of reverse movement of the second drive shaft comprising an arm mounted on the stop carrier, manually controlled means for shifting said arm, a locking means for holding the stop carrier in shifted position, and means for preventing operation of said locking means until after the second drive shaft has started its reverse movement.

21. The combination with a power shaft, of a drive shaft, a second drive shaft, reversing mechanism connecting said power shaft with said second drive shaft and including a movable clutch carrier, a screw mounted on the clutch carrier and rotatable with the first drive shaft, a stop adjustable on said screw, a stop carrier rotatably mounted and held against longitudinal movement on said screw and provided with a plurality of stops, a second screw rotatable with said second drive shaft, a stop movable on said second screw and cooperating with the stops on the first mentioned screw, means for selectively positioning said stop carrier to vary the extent of reverse movement of the second drive shaft comprising an arm mounted on the stop carrier, manually controlled means for shifting said arm, and a stationary cam in the path of said arm whereby additional movement of said manually controlled means will actuate said arm against the cam and effect corresponding movement of the clutch carrier.

22. The combination with a power shaft, of a drive shaft and reversing mechanism for connecting said shafts including a pivotally mounted clutch carrier, a clutch element supported in a yoke at one end of the clutch carrier, a rotatable screw supported in a yoke at the opposite end of the clutch carrier, adjustable and stationary stops mounted on said screw, and a second screw rotatable with said drive shaft and having a stop adjustable thereon and cooperating with the stops on the first mentioned screw to effect shifting movement of the clutch carrier.

23. The combination with a power shaft and a drive shaft, of reversing mechanism for connecting them comprising a movable clutch carrier and a clutch element mounted thereon, a tapered cam on said clutch carrier, a spring actuated follower movable along and engageable alternately with opposite surfaces of said cam, and means for moving the clutch carrier alternately in opposite directions.

24. The combination with a power shaft and a drive shaft, of reversing mechanism for connecting them comprising a movable clutch carrier and a clutch element mounted thereon, a tapered cam on said clutch carrier, a spring actuated follower movable along and engageable alternately with opposite surfaces of said cam, means for moving said follower along one of said cam surfaces to bring it close to the tip of the cam just prior to movement of the clutch carrier, and means for moving the clutch carrier alternately in opposite directions.

25. The combination with a power shaft and a drive shaft, of reversing mechanism for connecting them comprising a movable clutch carrier and a clutch element mounted thereon, a tapered cam on said clutch carrier, a spring actuated follower movable along and engageable alternately with opposite surfaces of said cam, means for moving said follower along one of said cam surfaces to bring it close to the tip of the cam just prior to movement of the clutch carrier, means controlled by said drive shaft for moving said follower, and means for moving the clutch carrier alternately in opposite directions.

26. The combination with a power shaft and a drive shaft, of reversing mechanism connecting said shafts including a movable clutch carrier and a clutch element mounted thereon, a second drive shaft, a screw on the clutch carrier rotatable with the second drive shaft, a stop adjustable on said screw, a stop carrier on said screw, a pair of stops on said stop carrier, a second screw rotatable with the first drive shaft, a stop adjustable on said second screw and cooperating with the stops on the first screw, and means for turning said stop carrier to select one of said pairs of stops to permit reverse movement of the first drive shaft for feeding only or for feeding and cutting.

WHITTEN P. LLOYD.
MAXWELL H. HILL.